US008583562B1

(12) United States Patent
McDaniel et al.

(10) Patent No.: US 8,583,562 B1
(45) Date of Patent: Nov. 12, 2013

(54) PREDICTING REAL ESTATE AND OTHER TRANSACTIONS

(75) Inventors: Terrence Lee McDaniel, Alamo, CA (US); Bradley John McDaniel, Alamo, CA (US); John Phillip Norman, Port Washington, WI (US); Michael LaMar Robbins, Belgium, WI (US); Earl D. Sacerdoti, Alamo, CA (US)

(73) Assignee: RealAgile, Inc., Alamo, CA (US)

( * ) Notice: Subject to any disclaimer, the term of this patent is extended or adjusted under 35 U.S.C. 154(b) by 584 days.

(21) Appl. No.: 12/571,350

(22) Filed: Sep. 30, 2009

Related U.S. Application Data

(60) Provisional application No. 61/101,837, filed on Oct. 1, 2008.

(51) Int. Cl.
*G06Q 50/00* (2012.01)

(52) U.S. Cl.
USPC .......................................................... 705/313

(58) Field of Classification Search
USPC .......................................................... 705/313
See application file for complete search history.

(56) References Cited

U.S. PATENT DOCUMENTS

| | | | |
|---|---|---|---|
| 5,361,201 A | 11/1994 | Jost et al. | |
| 5,636,117 A | 6/1997 | Rothstein | |
| 5,680,305 A | 10/1997 | Apgar, IV | |
| 6,301,563 B1 | 10/2001 | Brown et al. | |
| 6,401,070 B1 | 6/2002 | McManus et al. | |
| 6,556,992 B1 | 4/2003 | Barney et al. | |
| 6,609,109 B1 | 8/2003 | Bradley et al. | |
| 6,876,955 B1 | 4/2005 | Fleming et al. | |
| 7,219,078 B2 | 5/2007 | Lamont et al. | |
| 7,236,985 B2 | 6/2007 | Brecher | |
| 2002/0035520 A1* | 3/2002 | Weiss | 705/27 |

OTHER PUBLICATIONS

SMR Research Corporation. "Life Insurance—High-End Life Insurance and Annuity Marketing Model." 2006, pp. 1-6, <http://www.smrresearch.com/Life_insurance_Model.pdf>.
ProspectsPLUS! "MLSMailings.com Always Working for You." No date, pp. 1-5, <http://www.mlsmailings.com/why.html>.
Smartzip, Inc. "Investment Ratings for Real Estate." Sep. 2008, pp. 1-3, <http://www.smartzip.com/SmartZip-Score/sz/info/score>.
Sklarz. "Fidelity Data Mining Product to Identify Highest Probability Homebuyers and Home Sellers." Presentation to the MBA Conference, Oct. 26, 2004, pp. 1-13, Fidelity National Financial.

* cited by examiner

*Primary Examiner* — Jami A Plucinski
*Assistant Examiner* — Vern Cumarasegaran
(74) *Attorney, Agent, or Firm* — Ralph P. Albrecht; ATFirm PLLC

(57) ABSTRACT

A technique for estimating the relative likelihood that specific parcels or groups thereof will sell within a selected time, possibly including such steps as: Responsive to location of each parcel with respect to other parcels that have recently sold, including receiving a $1^{st}$ kind of information, associated with sales in a neighborhood for each parcel being examined, including a set of attributes. Deriving additional attributes for each parcel based on its attributes and others near it. Determining independently for each neighborhood which of those attributes are more important for estimating relative likelihood of sale. Determining a degree of similarity between each unsold parcel and each recently-sold parcel, in response to those sets of attributes, weighted in response to relative importance. Providing a $2^{nd}$ kind of information, ordering parcels by a relative likelihood of sale within a selected time.

24 Claims, 3 Drawing Sheets

US 8,583,562 B1

PREDICTING REAL ESTATE AND OTHER TRANSACTIONS

INCORPORATED DISCLOSURES

This application claims priority of the following document.
U.S. Provisional Patent Application 61/101,837, filed Oct. 1, 2008, in the name of the same inventors, titled "System and Method for Predicting Real Estate Transactions,".
This application also includes the following documents.
Appendix A, "List of Attributes for One Embodiment of the Invention".
Each and every one of these documents is hereby incorporated by reference as if fully set forth herein.

BACKGROUND

A number of businesses relate to sales of structures, such as residential and commercial buildings, and land they stand upon. For example, the residential real estate market includes businesses whose customers are drawn from buyers and sellers of real property, as well as those who serve them, such as real estate agents, insurance agents, mortgage lenders, mortgage brokers, providers of moving products or services, painters, landscapers, and the like. These businesses have an interest in allocating their resources in an efficient and effective manner to many activities, such as for example, selecting retail locations, local advertising, direct mail marketing, and other parcel-specific and locale-specific marketing investments on the parcels most likely to generate the most business.

One problem in the known art is such businesses do not have any way with any measurable degree of precision or reliability, of predicting which parcels, if any, will be involved in a business transaction in the reasonably near future, that is, within a duration for which business planning is sensible. In the known art, similar problems exist for any businesses whose customers are drawn from households that are buying or selling a home, households changing occupancy in rented or leased units, businesses buying or selling real property, or businesses that desire to choose locations based in part on the relative volume of real estate transactions nearby.

Known methods include the subjective judgments of experienced professionals, such as (for example and without limitation) real estate agents and other professionals involved in the real estate industry who have been established in a geographic area for a considerable amount of time. Without detracting in any way from these subjective judgments, they are, at best, educated guesses.

SUMMARY OF THE DESCRIPTION

This description includes techniques, including methods, physical articles, and systems, which provide a substantially precise and reliable way to estimate the relative likelihood that specific parcels or groups of parcels will be sold within a selected time.

The invention includes techniques, including methods, physical articles, and systems, that receive a $1^{st}$ kind of information, associated with a collection of parcels or other objects or structures being examined (sometimes referred to herein as a "market area" with respect to parcels) about prior sales relatively local to each parcel being examined. The particular information of the $1^{st}$ kind might include a set of attributes about each parcel, or its surrounding area, or parcels in that surrounding area, possibly expressed as values of selected variables. Each parcel's neighborhood might be examined to determine (independently for each neighborhood) which of those attributes about each parcel are relatively more or less important for estimating relative likelihood of sale (or other significant change such as a refinancing, or remodeling) within a selected time. Each set of attributes, weighted in response to localized relative importance, might be used to determine a degree of similarity in response to each parcel of interest and in response to each recently-sold parcel. The techniques, including methods and systems, might provide a $2^{nd}$ kind of information, to be associated with parcels or other objects or structures, expressing an ordering of parcels, or objects, or groups thereof, by a relative likelihood of sale within a selected time.

The invention includes techniques, including methods, physical articles, and systems, that receive real-world information dictated by real-world conditions (not mere inputs to a problem-solving technique). The techniques provided by the invention are transformative of the information received, at least in the sense that a $1^{st}$ type of information with respect to (for example) real estate parcels other than those being examined—information about prior local sales of selected parcels in an area proximate to those parcels being examined—is transformed into a $2^{nd}$ type of information, specific to those parcels being examined, specifically, estimated relative likelihood of sale within a selected time of those parcels being examined.

The invention includes techniques, including business methods, that are tied to a particular machine, at least in the sense that a business use of that $2^{nd}$ type of information is specific to examination of real-world information and is responsive to that $1^{st}$ type of information. While this description is primarily directed to that portion of the invention in which a general-purpose computer plays a prominent role, this description also shows that a general-purpose computer would not alone be sufficient to perform methods, or comprise systems, within the scope and spirit of the invention.

BRIEF DESCRIPTION OF DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF VARIOUS EXEMPLARY EMBODIMENTS

Generality of the Description

Figure 1:
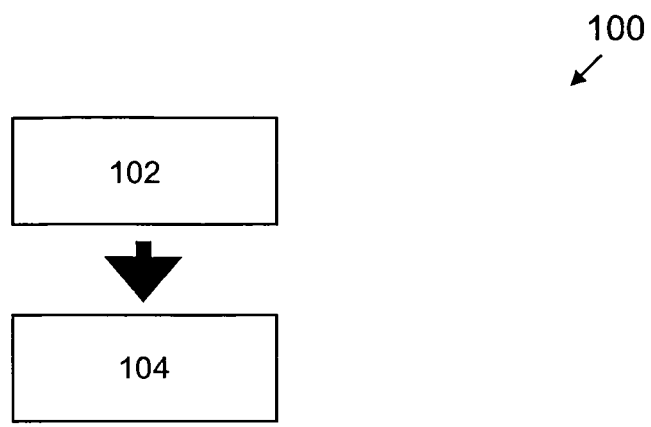
FIG. 1 shows an example conceptual diagram of a process flow, including flow labels and method steps as shown in the figure, including at least a method of ranking parcels.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

The invention is in no way limited to the specifics of any particular embodiments and examples disclosed herein. Many other variations are possible which remain within the content, scope and spirit of the invention, and these variations would become clear to those skilled in the art after perusal of this application.

Definitions and Notations

The following definitions and notations are exemplary, and not intended to be limiting in any way:

The terms "attribute", and the like, generally refer to any distinguishing characteristic a parcel might have, such as for example lot size, number of bedrooms, or roofing type. While this description is primarily with respect to real estate, with the effect that the particular attributes described are those which real estate parcels might have (such as the color of the house built on the property, or whether it is "colonial" or "modern" style, and the like), in the context of the invention, there is no particular reason for any such limitation. For example and without limitation, an attribute in the context of, say, motor vehicles, might refer to engine size, number of axles, and the like. As described herein, attributes might have values that are continuous (such as price) or discrete (such as roofing type).

The terms "neighborhood", the phrases "relatively local" and the like, generally refer to a collection of parcels within a selected distance, such as for example one-half of a mile. This is sometimes also or instead referred to herein as a "micro-market". While this description is primarily directed to techniques in which a "neighborhood" relates to geographical distance, in the context of the invention, there is no particular reason for any such limitation. For example and without limitation, a "neighborhood" might refer to a cluster of parcels having substantial similarity, such as for example, all homes selling for more than $1,000,000.

The terms "order", the phrases "rank order", and the like, generally refer to an ordering of a set of objects, in which there is (excepting ties) a best object and a worst object, and (excepting the best and worst objects) in which each other object has one better and one worse such object. While this description is primarily directed to techniques in which such an ordering is (excepting ties) a substantially complete ordering, in the context of the invention, there is no particular reason for any such limitation. For example and without limitation, an order might refer to a partial ordering of parcels, in which at least one parcel is placed first, and all other $1^{st}$ particular parcels are placed before one or more $2^{nd}$ particular parcels. This type of partial ordering would have the effect that two selected parcels might not necessarily be commensurable, while still providing useful information about which parcels are more likely or less likely to sell within a selected time.

The terms "parcels" or the phrases "groups of parcels", and the like, generally refer to any ownership interest in real estate, including easements, options, tenancies, and other legal concepts relating to real estate. As described herein, while this description is primarily directed to parcels having to do with real estate, in the context of the invention, there is no particular reason for any such limitation. For example and without limitation, where "parcels" refers to objects such as motor vehicles, description herein with respect to attributes would refer to attributes of motor vehicles, such as for example, engine size, inside room, number of axles, and the like.

The terms "sale", and the like, generally refer to any form of transfer, not necessarily limited to ownership. As described herein, while this description is primarily directed to sales of parcels in which an entire interest is transferred, in the context of the invention, there is no particular reason for any such limitation.

The phrases "selected time", and the like, generally refer to a time duration selected by the designers or operators of a system performing a method as described herein. While this description is primarily directed to techniques in which a "selected time" is a known value, such as for example 6 months or 18 months, in the context of the invention, there is no particular reason for any such limitation. For example and without limitation, a "selected time" might refer to a variable duration, in the context of real estate, from the opening of a new development for sale to the completed sales of 90% (or some other percentage) of that development.

The phrases "spatial units", and the like, generally refer to collections of parcels and their neighborhoods, as described herein. In the context of the invention, there is no particular reason that spatial units refer to actual bounded areas in a 2D or 3D region. For example, in the context of automobiles, a spatial unit might refer to those automobiles available for sale at a particular dealership.

The terms "weighted", and the like, generally refer to a degree of emphasis placed on an attribute or its value, when making a determination. While this description is primarily directed to techniques in which a "weighted" attribute is one that has been multiplied by a real-valued coefficient, such as 11/12 or 9/10, in the context of the invention, there is no particular reason for any such limitation. For example and without limitation, a more weighted attribute might be considered lexicographically prior to a less weighted attribute, or a more weighted attribute might refer to one having a higher centile ranking than a less weighted attribute.

After reading this application, those skilled in the art would recognize that these definitions and notations would be applicable to techniques, including methods, physical elements, and systems, not currently known, or not currently known to be applicable by the techniques described herein (and including extensions thereof that would be inferred by those skilled in the art, even if not currently obvious to those of ordinary skill in the art).

FIGURES AND TEXT

FIG. 1

FIG. 1 includes a conceptual diagram of a process flow.

FIG. 1 includes flow labels and method steps as shown in the figure, including at least a method of ranking parcels.

In one aspect, a method 100 determines an index score for each particular parcel, with the effect of providing a measure of similarity between that particular parcel and other parcels which have sold within a selected past time.

Ranking of parcels begins with determining the attributes (102) that may be employed in deriving their rank-ordering. The choice of particular attributes might be determined by the cost-effective availability of data sources providing recent parcel inventory data (such as owner, address, time in home, lien amount, number of rooms, and number of bathrooms), and recent demographic data (such as household income and number of children under 18) aggregated over standard spatial units. Spatial units are geographically organized collections of parcels.

Spatial units might include hexagonal areas, generally with radii one-quarter mile in length. However, in the context of the invention, there is no particular requirement therefor. Spatial units might include other sizes and shapes for spatial units (for example, Census Tracts, Census Block Groups, postal codes, or neighborhoods), may employ spatial units of varying size depending on factors such as the density of parcels. In addition or instead, ranking might also use other data relating to real estate parcels, such as aesthetic judgments, age of parcel improvements, community or neighborhood style, demographic data, earthquake or fire zoning, legal title (for example and without limitation, whether the real estate parcel is held in fee simple or not, as opposed to, say, condominium housing), real estate zoning, or may use other data associated directly with individual parcels or associated with collections of similar parcels.

In the context of the invention, there is no particular requirement for these particular attributes to be required, or even to be used. For example and without limitation, any, some, or even none of these particular attributes might be used. In addition to these particular attributes, other and further types of attributes might be used, including without limitation, the following.

- historical, demographic or psychographic data,
- demographic or psychographic projections,
- historical, recent, and projected information about business establishments,
- historical, recent, and projected information about employment,
- historical, recent, and projected information about lifestyle segmentation, such as for example a global "MOSAIC" classification (MOSAIC is a lifestyle segmentation system developed by Experian. Detailed information about MOSAIC can be obtained from their web site.),
- historical, recent, and projected information about transportation systems (such as roads, highway access, bus routes, terminal facilities, and the like),
- water features,
- historical, recent, and projected information about land use characteristics (such as parks and shopping centers),
- historical, recent, and projected information about legislative and regulatory enactments (such as for example, frequency thereof), and
- historical, recent, and projected information about political and administrative boundaries (such as municipalities and school districts).

Such attributes may be used if their values are available on a parcel-by-parcel basis, or if available, for spatial units near to or containing the parcels being analyzed. In addition, attributes concerning specific households (such as a child leaving for college or an impending divorce) or neighborhoods (such as the impending opening of a business within a defined distance buffer zone), whose values are known to a user of the system, may be employed, even if they are only known for some of the parcels in a spatial unit. The values of the selected attributes are acquired and integrated (104) for the parcels of interest.

Rank-Ordering Parcels

Figure 2:
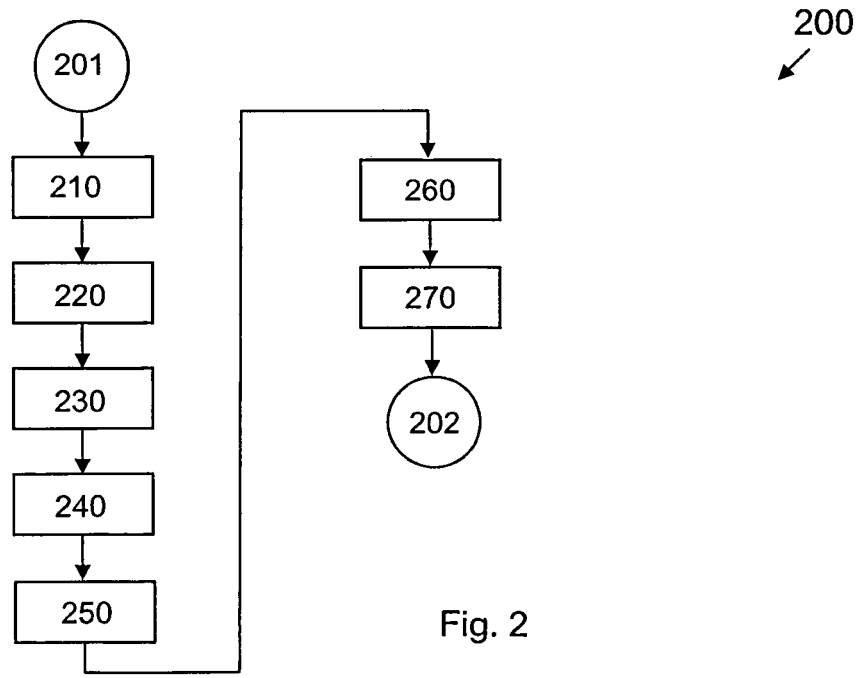
FIG. 2 shows an example process flow diagram of a method of rank ordering parcels including flow labels and steps as shown in the figure, including receiving raw information, processing and providing processed information.

FIG. 2 shows a process flow diagram of a method.

A method 200 includes flow labels and steps as shown in the figure, including at least:

A flow label 201 indicates a beginning of the method 200.

Receiving Raw Information

At a step 210, the method 200 receives raw information 411 from data sources 212, for example and without limitation, information relating to real estate parcels. Although this description primarily relates to real estate parcels, and in particular with respect to real estate parcels that include improvements, e.g., homes or other buildings—in the context of the invention, there is no need for any such limitation.

For some examples and without limitation, the raw information 211 might relate to antique items in an antique store, books or book titles in a book store, clothing in a clothing store or department store, furniture pieces in a furniture store, or other information for which it might be useful to determine a rank-order, or a similar order, for likelihood of future transactions. In the examples given in this particular paragraph, the raw information 211 would relate to real-world information about real-world objects.

Upon reading this application, those skilled in the art would recognize that the method 200 is transformative of the information it receives, at least in the sense that one type of information with respect to (for example) real estate parcels is transformed into a distinct type of information. The information received with respect to real estate parcels includes real-world information dictated by real-world conditions, not mere inputs to a problem-solving technique. At least some of the information provided by the method 200 also includes real-world information descriptive of real-world conditions, not mere outputs from a problem-solving technique.

In one aspect of the invention, the information 211 includes one or more of the following attributes of each particular parcel: latitude, longitude, lot size, sale date(s), population in the local area, population under 18 in the local area, population over 65 in the local area, building area, building age, and sale price(s).

The method 200 maintains the raw information 411 from the data sources 212 in one or more databases 213. The one or more databases 213 need not be immediately coupled to the data sources 212. For example and without limitation, the one or more databases 213 might be logically remote from the data sources 212, and accessible to the method 200 using a communication link 214. For example and without limitation, the communication link 414 might include a communication network such as, for example and without limitation, an internet.

The method 200 might determine some additional information 215 in response to at least the raw information 211, and possibly in response to one or more rules 216 for manipulating that data. Such rules 216 might be deterministic, or might be heuristic in nature. For example and without limitation, street addresses might be converted to a set of 2D location information, possibly using a deterministic technique sometimes called "geocoding". For example and without limitation, geocoding might provide a set of 2D location information, e.g., latitude and longitude, in response to a street address. Alternatively, street addresses might be converted to a neighborhood description using a heuristic technique, such as an expert system.

For example and without limitation, a $3^{rd}$ dimension of information (which could have the effect, when combined with the 2D information, of providing 3D information) might include a measure of elevation, such as, for example and without limitation, a floor number in a multi-story apartment or condominium, or such as, for example and without limitation, a basement number or a parking level number for a parking space, which itself might be rented, owned, or otherwise assigned to an apartment or condominium. A $4^{th}$ dimension, and further dimensions, might include other information about a parcel, for example and without limitation, a measure of slant of the parcel surface, a measure of how much of the parcel is submerged, a direction of a view or a measure of value of a view from the parcel (such as for apartments or condominiums) or other information. The information encoded in these dimensions need not be limited to physical attributes of a parcel considered alone, but might include characteristics such as tree coverage or average wind speed.

Locality within a 2D reference frame may be one of the factors used in determining the likelihood of whether a parcel will sell in the near future (say, 6 months, although this particular value is not particularly required). Accordingly, this description is at least partially directed to a method in which each parcel is considered within a 2D reference frame.

While this description is directed at least in part to a method in which each parcel is considered within a 2D reference frame of real-world distance, in the context of the invention, there is no particular requirement for any such limitation. For example and without limitation, functional distances, such as walking distance, driving distance, reduction in strength of electromagnetic or sound signals, or other considerations possibly deemed "distance", would be within the scope and spirit of the invention.

The method 200 might maintain the additional information 215 in the one or more databases 213, or in one or more other databases, possibly similar to, similarly located as, or distinctly located from, those one or more databases 213.

In one aspect of the invention, the data sources 212 might include one or more of the following.

Parcel inventory data might be acquired from Fidelity Lender Processing Services, a commercial provider of data drawn from County Assessor files throughout the United States, or any similar service (or any collection of services providing similar collective coverage).

Parcel attributes include spatial attributes that allow for the determination of the parcels' location.

Demographic data might be acquired from Scan/US, Inc, a commercial provider of desktop mapping and demographic solutions, which offers a product called Scan/US for Windows that incorporates data including population, households, ethnicity, income, education, work status and age distributions aggregated by spatial units.

Other additional data such as might be indicative of the attributes shown in Appendix A.

However, in the context of the invention, there is no particular requirement to use these particular sources, or to use more than one source of data, or to use data that is subdivided in these particular ways.

The parcel locations are included in the data received from Fidelity Lender Processing Services as values for latitude and longitude. Location information might be encoded in other formats, or encoded as another spatial coordinate that represents the centroid or other representative location point for each parcel. This point location can be derived from address information, commonly called Geocoding, or may come from a calculated centroid (geographic center) of the actual parcel boundaries, or it may be generated manually using maps or with a GPS unit, or any other method of determining geographic location.

Data values might be acquired from other or additional commercial or governmental sources, for example the US Census Bureau, information about parcels currently on the market from Multiple Listing Services, a user's customer relationship management system or contact file, or personal observations noted by a user. Other real-time or near-real-time data sources might be incorporated, in response to their availability. For example and without limitation, data with values for individual parcels or for spatial units might be acquired.

Data values might be imported into Manifold, a commercially available Geographic Information System (GIS) from Manifold Net Ltd. However, other and further means of managing the attributes and their values might be employed in addition or in lieu thereof. Such means include alternative GIS's, any software program that permits storage, manipulation and retrieval of data (such as a database management system, a file system, or a spreadsheet program), or a manual filing system.

In one aspect of the invention, one or both of two activities might optionally be performed during or after each step of acquiring data from the data sources 212. These two activities include data cleaning and derivation of values of additional attributes from values of attributes already acquired or derived.

Data Cleaning

Data sources sometimes contain errors. Standards for encoding data may differ among localities. Accordingly, data cleaning might be helpful in providing a relatively error-free set of data (sometimes known as a "clean" set of data). Known methods might be used to remove data records containing outliers or errors, or to replace incorrect values with other values. For example and without limitation, a standard deviation, minimum, and maximum are calculated for each attribute in a data set. Rules are established for each attribute to determine if a value for that attribute is out-of-range, and if so, whether to discard the record or keep it, and if to keep it, what value to substitute for the attribute value that is out-of-range. For example and without limitation, the Box and Whisker functions of the Statistica package might be used to identify parcel records with an attribute whose value is considered an outlier.

In an embodiment of the invention, such outlier values are discarded for purposes of developing the "general" model in step 255 of FIG. 2. While the statistical methods described above can be used to establish definitive rules, it may also be applicable to use professional judgment when determining whether a given attribute is truly out-of-range.

For demographic records (for example and without limitation, associated with a spatial unit) with attributes having outlier values, the average value of the attribute over the spatial unit in question might be substituted for the outlier. However, in the context of the invention, there is no particular requirement for this particular technique. Other and further rules might be applied for some or all parcels and spatial units (for example, a value might be considered to be an outlier if it is greater than 2.5 standard deviations from the mean, and if so, an average value might be substituted for that outlier value, or if so, that parcel might be removed from the dataset being analyzed), or different rules may be applied in response to type of parcel or in response to different localities.

It might occur that some of the data values are associated with individual parcels and some with spatial units. If no data were associated with spatial units, the method skips the steps of sorting parcels into spatial units, deriving additional attributes about the spatial units, and performing data cleaning with respect to these derived attributes. Where there are available data sources associated with both individual parcels and spatial units, the data is integrated. After derivation of computed attributes and data cleaning, the parcels are sorted into spatial units based on the location of the centroid of the parcel. Other and further known methods for associating a parcel with a spatial unit might be used. These might include associating a parcel with a given spatial unit if a majority of the property (based on the property boundary) is located within a given spatial unit.

It might occur that there are one or more cases for which a spatial unit does not contain a parcel. Parcels not contained by the preferred spatial unit may be associated with a spatial unit based on their proximity to the nearest such spatial unit. The association might instead be performed with other spatial methods, or parcels may be associated based on non-spatial methods. When addressing units in multi-floor structures, spatial attributes of parcels and spatial units might incorporate a third dimension to reflect location within the multi-floor structure.

Within each spatial unit, an average, standard deviation, minimum and maximum of the values of each attribute employed in the analysis of substantially all the parcels within the spatial unit are computed. Other statistical measures might also be computed, such as the mode, median, range and variance. This computation might be performed separately for each different type of parcel (for example, single family residence, townhome, or condominium) within each spatial unit. While this description relates to an embodiment in which these computations are performed with respect to both demographic data that is received and applicable to spatial units, and additional data that was computed and applicable to spatial units, in the context of the invention, there is no particular requirement for any such limitation.

Deriving Other Information

At a step 220, the method 200 determines derived information 421 in response to one or more of: the raw information 211 (as possibly augmented or modified at the step 210), and possibly one or more rules for manipulating that data. For example and without limitation, from a "date of last sale" value for a parcel, the method 200 might determine a "months since last sale" value in response to the date on which the determination is made.

One technique includes at least a method of calculating prior sales within a selected time and with a selected relationship to each parcel of interest (for example and without limitation, within a selected distance buffer zone of each particular parcel of interest).

Sale frequency information might be calculated for each parcel. A period in the recent past for which sales data is available is selected, such as for example the 18-month period prior to the month in which the process is performed. The method determines, possibly in response to County Assessor data, if a sale has been made within a $1^{st}$ earlier selected time (such as for example, the most recent 18 months). However, in the context of the invention, there is no particular requirement for this particular duration or technique.

For example and without limitation, it is possible to use other time periods, to derive information about multiple sales over a time period, or to use current or historical data from local Multiple Listing Services to identify or infer that a sale has occurred within a selected time period. Each sale within the selected period might be classified into two categories: built after the start of the time period and never sold (new property sale), and either built prior to the start of the time period or built after the start of the time period and previously sold (existing property sale). Other and further classifications might be used, or the method might treat the entire set of parcels as a single class.

A sales distance buffer might be calculated for each parcel. This has the effect of deriving the total number of sales that occurred during a $2^{nd}$ selected time (such as for example, the most recent 6 months), within a selected distance (such as for example one-quarter mile linear distance) of each parcel. The method determines if there are any parcels for which this calculation has not yet been performed. If so, one or more are chosen, and a buffer with a quarter-mile radius surrounding the parcel is determined using techniques available as standard functions in many GIS packages and spatially enabled data base management systems. The number of parcels within the distance buffer that were sold within the $2^{nd}$ selected time is counted. This number is associated with the chosen parcel as the value of a particular attribute sometimes referred to herein as "NUMBER OF RECENT SALES".

While this description is primarily with respect to 2D linear distance from each particular parcel, in the context of the invention, there is no particular reason to require any such limitation. For example and without limitation, it might be possible to use other time periods, other distances, or other methods of determining distances (such as "functional distances" like driving distance or walking time, or distances reflecting spatial relationships within a high-rise building), or to derive information about multiple sales within a distance buffer over a selected time period. Moreover, while this description is primarily with respect to cases in which the $1^{st}$ and the $2^{nd}$ earlier selected time have distinct values, in the context of the invention, there is no particular requirement for any such limitation. Alternative or additional derived attributes might be determined in addition to or in lieu of these particular derived attributes, such as for example a percentage of total parcels within the distance buffer that were sold within a time period, or an average time between sales of parcels within the distance buffer.

The method 200 maintains the derived information 221 from the step 220 in one or more databases. The one or more databases need not be immediately coupled to the data sources. For example and without limitation, the one or more databases might be logically remote from the data sources, and accessible to the method 200 using the communication link, or possibly a different communication link.

Interpolation of Attribute Values

At a step 230, the method 200 interpolates values of selected attributes between those parcels which have sold recently and those which have not. Such interpolated values of selected attributes can be employed together with other raw and derived information in characterizing parcels. In this step, "recently" might mean within a selected time, and the selected time might be about 18 months, but there is no particular requirement for this particular selected time. For example and without limitation, this step might be performed using "kriging", a known interpolation technique. See, e.g., the Wikipedia entries related to kriging, and related to other exemplary interpolation techniques.

FIG. 3

Figure 3:
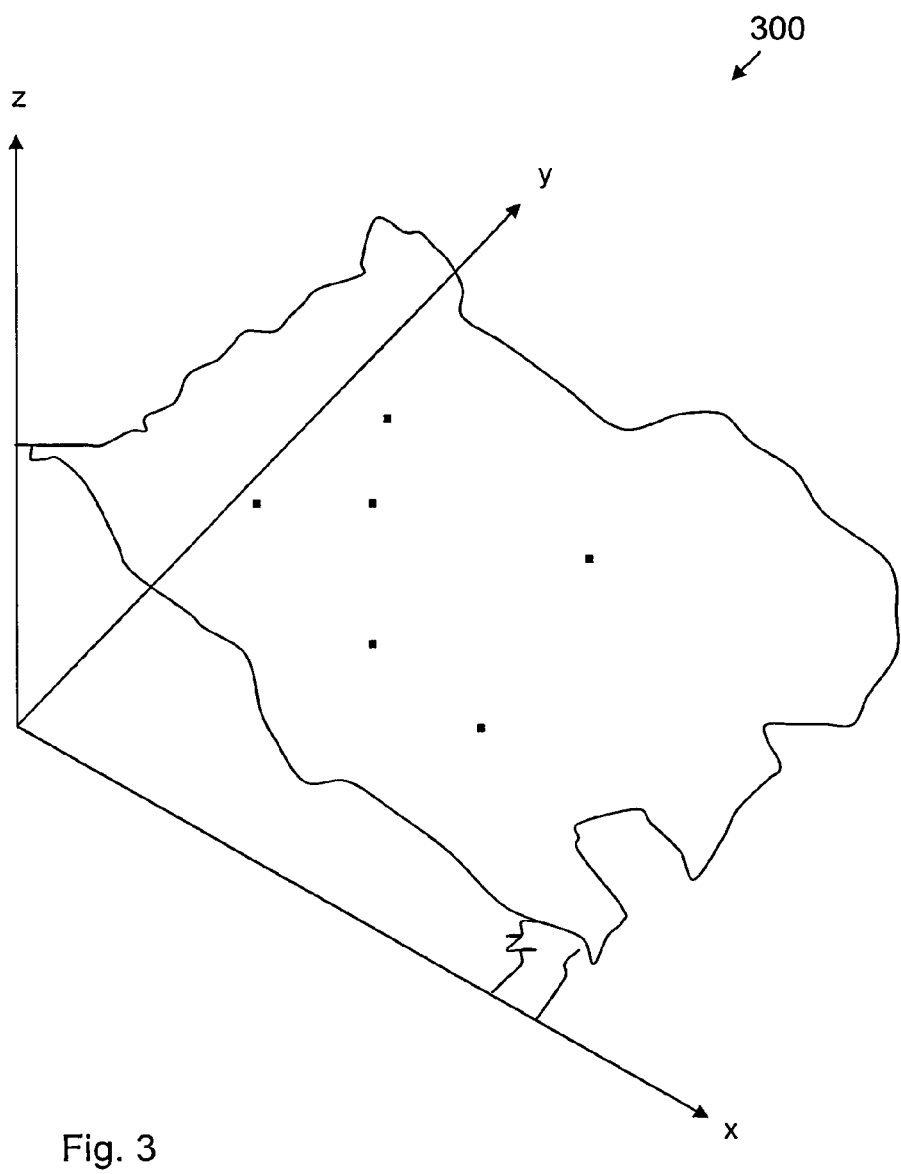
FIG. 3 shows an example conceptual diagram of a data structure including a conceptual structure, including at least an example of a data structure which might be used for interpolation in an exemplary three dimensional coordinate space.

This step is illustrated in part with respect to a FIG. 3.

FIG. 3 shows a conceptual diagram of a data structure.

A data structure 300 includes conceptual structure as shown in the figure, including at least an example of a data structure which might be used for interpolation. Axes X 301, Y 302, etc., indicate a location of each parcel's attribute values, considered as a vector of attribute values in a 2D space ($R^a$) and using an x coordinate for the X axis 301, and a y coordinate for the Y axis 302. In the figure, only two such attribute values are used so that it is possible to easily represent a surface z(x, y) 310, representing a function that might be used for interpolating attribute values.

In this circumstance, the surface z(x, y) 310 is used for interpolating attribute values for unsold parcels (which might include sold parcels that could be resold) in response to sold parcels. A set of dots 311 each represents a parcel. A set of coordinates of such a dot 311 each represents a value of an attribute.

While this description is at least partially directed to a method in which each parcel is considered individually, in the context of the invention, there is no requirement for any such limitation. For example and without limitation, each dot 311 might represent a set of parcels deemed equally (or almost equally) likely to sell within the next selected time, where the selected time is about 6 months, but there is no particular requirement for that choice of selected time. For example and without limitation, it might be deemed computationally easier to treat all condominiums in a single building equally or almost equally, or it might be deemed computationally easier to treat all parking spaces in a single parking structure equally or almost equally.

Other and further techniques, such as possibly deliberately selecting sets of parcels for evaluation, evaluating those sets, and evaluating each parcel within each such set, are also possible, and are within the scope and spirit of the invention.

In the FIG. 3, an axis Z 303 represents a value for the surface function z(x, y) 310, on which each dot 311 has a height representing a value, either original or interpolated. One might visualize the surface function z(x, y) 310 as having a set of, say, "red dots" (i.e., dots 311 of a $1^{st}$ type), each representing a parcel whose values are used for interpolation (e.g., a parcel which has sold recently) and a set of, say, "gray dots" (i.e., dots 311 of a $2^{nd}$ type), each representing a parcel whose values are determined by the interpolation technique (e.g., kriging).

While this description is at least partially directed to a method in which each parcel is represented by two axes X 301 and Y 302, thus a vector of attribute values in a 2D space ($R^a$), in the context of the invention, there is no particular requirement for any such limitation. For example and without limitation, it is possible to consider each parcel as being represented by a vector of attribute values in a 3D space, with the effect of having an x coordinate on the X axis 301, a y coordinate on the Y axis 302, and a z coordinate on the Z axis 303, with the effect of identifying parcels within a 3D attribute value space ($R^3$), and having a surface function w(x, y, z) 310 with three input arguments for interpolation within that 3D space ($R^3$).

Similarly, this description might be generalized to account for a vector of attribute values in an n-D attribute value space ($R^n$), where n is the number of attribute values to be considered for each such parcel. In such cases, there would be defined a surface function $f(v_1, \ldots, v_n)$, 310 with n input arguments for interpolation within that n-D attribute value space ($R^n$). For example and without limitation, n might be about 20.

As noted above, interpolation might be performed using kriging. A surface function z(x, y) 310 is determined in response to the "red dots", i.e., parcels whose values are used for interpolation. This has the effect that z(x, y) 310 is responsive to $z_i(x_i, y_i)$, for all i representing parcels whose values are used for interpolation, and $z_j(x_j, y_j)$ is responsive to z(x, y) 310, for all j representing parcels whose values are being interpolated. Those skilled in the art would easily be able to generalize this description to an n-D attribute value space, with interpolation being performed on n attribute values concurrently. Such generalization would not require undue experimentation or new invention, and would be within the scope and spirit of the invention.

Selection of Attributes

In one embodiment, a predefined set of key attributes is used. Alternatively, a subset of a known set of attributes may be determined, for example by creating a linear model that predicts the number of sales during the selected recent 18-month period, using a forward-stepping stepwise regression. The attributes of the spatial unit might be considered as candidate independent variables to be included in the linear model that predicts a dependent variable: the number of sales during the selected recent 18-month period.

In one embodiment, the selected attributes might be determined by starting with a large set of attributes (perhaps even more than one hundred from parcel attributes, available demographic attributes, derived attributes like sale to parcel ratio, and interpolated attributes like a sale price estimate) and using both stepwise regression and professional judgment to select a preferred subset for use (currently about 11 such attributes, as detailed in an Appendix A, hereby incorporated by reference as if fully set forth herein).

While this description is primarily directed to employing a predefined set of about 11 key attributes that, for the spatial units and the time period considered, best predict the number of sales per spatial unit, in the context of the invention, there is no particular requirement for such a limitation. Other methods (such as, other inferential statistical methods known in the art, rule-based expert systems, or neural networks) might be used, in addition or instead, to determine a set of key attributes, and may develop a different number of key attributes.

FIG. 4

Figure 4:
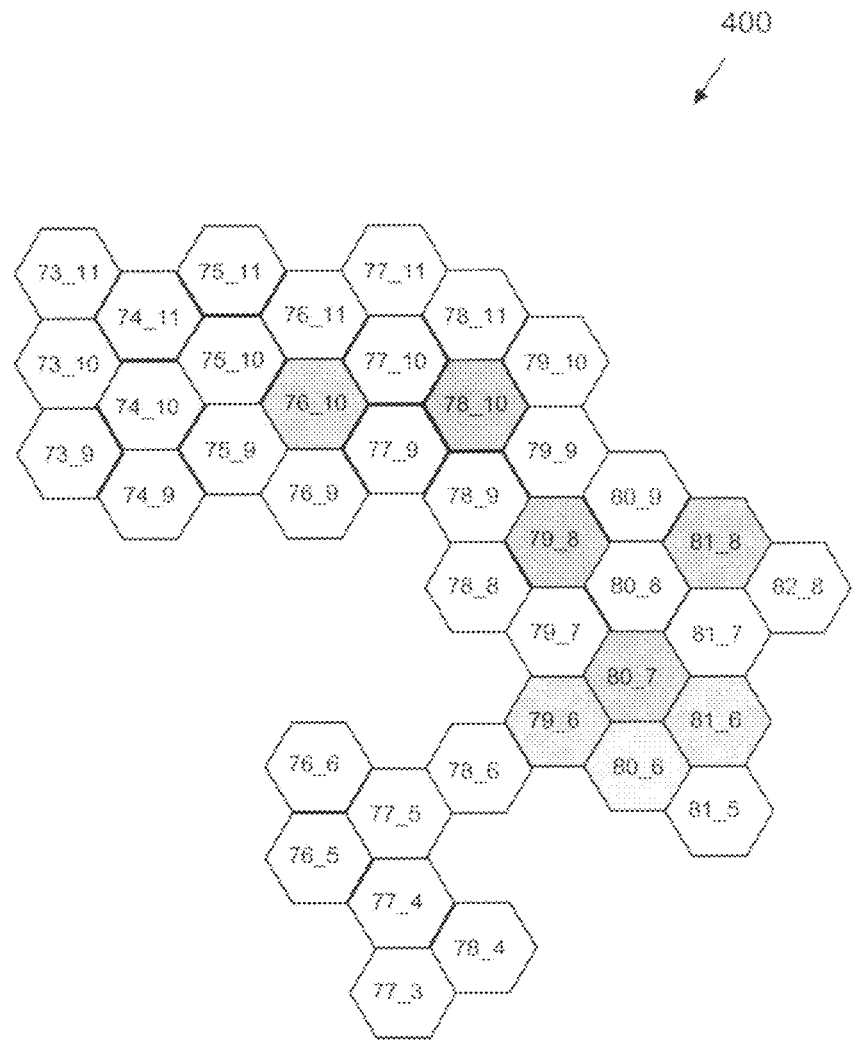
FIG. 4 shows an example conceptual drawing of a set of micro-markets.

This step is illustrated in part with respect to a FIG. 4.

A FIG. 4 shows a conceptual drawing of a set of micro-markets 410.

Determination of Micro-Markets

At a step 240 (shown in the FIG. 2), the method 200 refers to a set of micro-markets 410, having already assigned each parcel to a selected micro-market 410. Although this step 240 is described at this point with respect to the method 200, the set of micro-markets 410 are preferably determined earlier than the process described with respect to the method 200. For example and without limitation, micro-markets 410 might be determined once, when a market area is initially defined, while the rank-ordering described with respect to the method 200 is determined on a more frequent basis, such as for example, monthly, in response to new data.

For example and without limitation, this step might define a micro-market overlay 400 (FIG. 4), such as for example a tiling of a portion of the XY plane with hexagons having a side-to-side diameter of one-half mile, in which each hexagon represents a particular micro-market 410, and in which the parcels located within each particular hexagon are assigned to that particular micro-market 410.

While this description is primarily with respect to a micro-market overlay 400 with micro-markets 410 having a side-to-side diameter of one-half mile, in the context of the invention, there is no particular requirement for any such limitation. For example and without limitation, the geographical size or shape of each particular micro-market 410 might be determined in response to characteristics of the parcels themselves (such as for example, an average size, a density of improvements, or a set of zoning regulations), or of the market with respect to those parcels (such as for example, a rates of sales, or a $1^{st}$ or $2^{nd}$ derivative thereof, or a relative strength of pricing with respect to a national or regional index, or a $1^{st}$ or $2^{nd}$ derivative thereof, and otherwise).

While this description is primarily with respect to each parcel being assigned to a single micro-market 410, in the context of the invention, there is no particular requirement for such a limitation. For example, each parcel might be assigned to more than one, or even more than two, micro-markets 410, with the effect that each parcel might have an effect on the attribute values considered for one or more of the micro-markets 410 for which that parcel is assigned.

For example and without limitation, instead of determining the set of micro-markets 410 using a tiling of a portion of the XY plane with hexagons, the method 200 might determine the set of micro-markets 410 using an (overlapping) tiling of the XY plane with circles, with each circle having a center and radius similar to the hexagonal tiling described above.

In such cases, it might occur that a single parcel is assigned to two or even three such micro-markets 410. Each such parcel assigned to more than one such micro-market 410 might be allowed by the method 200 to be considered with respect to only one, or with respect to more than one, micro-market 410. The method 200 might assign such a parcel to a single such micro-market 410 randomly, or might assign such a parcel to all such micro-markets 410, or might select one or more of such micro-markets 410 in response to some aspect of the parcel, such as perhaps its similarity to the "average" parcel in each micro-market 410.

Canonical Sold Parcel in each Micro-Market

At a step 250, the method 200 determines a canonical sold parcel in each such micro-market 410 for which a sufficient number of sales, for example and without limitation, 3 or more, occurred during a $3^{rd}$ selected recent period, for example, the previous 6 months. This $3^{rd}$ selected recent period may be the same as the $1^{st}$ selected recent period determined in the step 420, but need not be. Values of particular attributes of sold parcels may be used to determine that they are not representative of the micro-market 410, with the effect of excluding them from the calculations of mean, variance and standard deviation of the canonical parcels. For example and without limitation, if the lot size of the parcel is more than (for example) 4 acres or the number of bedrooms is greater than (for example) 9 or the building area is less than (for example) 650 square feet, the sale might be excluded from the calculations. The limits used for other selective attributes may be determined by methods described above. This step is performed using flow points and steps as shown in the FIG. 2, including at least the following.

While this description is primarily directed to sales or other changes to real estate parcels, after reading this application, those skilled in the art would recognize that it would be applicable to other forms of predictive analytics, such as for example, purchasing patterns in local and regional areas, for restaurants, voting patterns, and otherwise.

At a sub-step %%% 251 (not shown in the FIG. 2), the method 200 determines the mean, variance, and standard deviation for each attribute to be used (that is, those attributes that were interpolated in the step 430).

At a sub-step 252 (not shown in the FIG. 2), the method 200 determines the coefficient of variation for each attribute to be used. The coefficient of variation for each such attribute is equal to the standard deviation divided by the mean, separately determined for each such attribute. Other and further measures of the distribution of each such attribute's possible values might be used, such as for example a measure of excess kurtosis when the attribute is modeled as having a Gaussian p.d.f., or such as for example a ratio of change at the 90% centile to change at the 50% centile of the value range of the attribute.

At a sub-step 253 (not shown in the FIG. 2), the method 200 orders, for each such micro-market 410, the attributes by relative consistency. For example, a measure of the best consistency might be responsive to the smallest non-zero coefficient of variance. Attributes with a value of zero for the coefficient of variance generally indicate missing data, and preferably have no influence in the model of that micro-market 410. The consistency of the attribute values is determined separately for each micro-market 410. This has the effect that it might occur that the consistency ordering for a $1^{st}$ micro-market 410 includes a substantially different order of attributes as the consistency ordering for a $2^{nd}$ micro-market 410, even if those $1^{st}$ and $2^{nd}$ micro-markets 410 are physically quite close.

While this description is primarily with respect to using the same or similar number of possible attribute values for each such micro-market 410, in the context of the invention, there is no requirement for any such limitation. The method 200 might independently, or at least separately, select a number of attribute values for each such micro-market 410. For example and without limitation, the method 200 might select all those attribute values whose coefficient of variance is lower than the 35% centile of all possible such attribute values—for that particular micro-market 410. This might have the effect of selecting 4 such attribute values for some micro-markets, 5 for others, 6 for still others, up to some selected number, such as possibly 11, or even more, such attribute values, each for a distinct micro-market 410.

At a sub-step 254 (not shown in the FIG. 2), the method 200 determines a canonical sold parcel for each said micro-market 410. For example and without limitation, the method 200 chooses the mean value and standard deviation for each of the selected attributes for each such micro-market 410. While this description is primarily with respect to using the mean value and standard deviation of the selected attributes to describe the canonical sold parcel, in the context of the invention, there is no requirement for any such limitation. The method 200 might select a value that is, say, 10% higher than the mean, or one-half standard deviation lower than the mean, or some other workable value.

At a sub-step 255 (not shown in the FIG. 2), the method 200 determines a "general" version of a canonical sold parcel. This "general" version is determined in response to the mean value and standard deviation of attributes of parcels sold in those micro-markets 410 in a market area, for which a sufficient number of sales occurred during the $2^{nd}$ selected recent time period. This "general" version is used in later analysis for those micro-markets 410 that had an insufficient number of sales in the $2^{nd}$ selected time period, for the analysis described with respect to the step 250.

While this description is primarily with respect to using parcels within micro-markets 410 within the same market area, in the context of the invention, there is no requirement for any such limitation. For example, the general version of a canonical sold parcel might be computed separately for each micro-market having an insufficient number of prior sales, or it might be determined in response to the values of attributes of other selected parcels inside or outside the micro-market and market area in question.

Dissimilarity of Salable Parcel from Canonical Parcel

At a step 260, the method 200 determines, for each salable parcel (which might include one or more of the prior sold parcels), a measure of dissimilarity from the canonical parcel determined for the micro-market 410 to which that salable parcel has been assigned. In such cases that a salable parcel might be assigned to more than one such micro-market 410, the method 200 might determine its dissimilarity from the canonical sold parcel for each of them, or might select one or more of them. For example, the method 200 might post hoc allocate the salable parcel to the micro-market 410 having the closest canonical sold parcel, as "closest" is described below.

This step is performed using flow points and steps as shown in the FIG. 2, including at least the following.

At a sub-step 261 (not shown in the FIG. 2), the method 200 determines, for each attribute value selected for that micro-market 410, a difference between the attribute value for the canonical parcel and the salable parcel.

At a sub-step 262 (not shown in the FIG. 2), the method 200 normalizes, for each attribute value selected for that micro-market 410, the difference in value determined in the just earlier sub-step. For example and without limitation, the difference might be normalized by dividing that difference by the standard deviation of the micro-market 410 used to create the canonical sold parcel (from sub-step 254).

At a sub-step 263 (not shown in the FIG. 2), the method 200 determines a weighting coefficient to assign to each of the normalized differences. This has the effect that differences from the value of the "best" such attribute are given more weight than differences from the value of the "worst" such attribute.

For example and without limitation, the method 200 uses a "sum-of-digits" method to determine the weight to assign to each such attribute, after that attribute's value has been normalized. This has the effect that, after the attributes have been rank-ordered by consistency within that micro-market 410, each is assigned a weight equal to 1/m, 2/m, ..., n/m, where n is the number of such attributes chosen having a non-zero coefficient of variance, and where m is the sum of the integers 1 ... n. This has the effect that m=n(n+1)/2. The "best" attribute is assigned a weight of n/m, the next-"best" attribute is assigned a weight of (n−1)/m, and so forth.

While this description is primarily with respect to using a "sum-of-digits" method to determine each weight to assign, in the context of the invention, there is no particular requirement for any such limitation. For example and without limitation, the method 200 might select a power-law weight assignment, sometimes known as Zipf's Law and sometimes known as the Pareto principle or 80/20 principle, each of which decrease weight with a value proportional to $n^x$, for some x, or a log-loss function, such as one which increases weight by a value of ln n, or possibly ln (n+k), for k>0, or some other workable weighting schema.

At a sub-step 263 (not shown in the FIG. 2), the method 200 determines the n-D Euclidean distance between each salable parcel and the canonical parcel, after each normalized attribute value difference has been weighted as in the just-earlier sub-step. This has the effect that a distance $d_i$ for each salable parcel i, equals the square root of the sum of the squares of each weighted normalized attribute value difference $v_j$. This has the effect that $d_i^a = \Sigma$ all $v_j^a$. The value for $d_i$ is sometimes referred to herein as the "MoveScore™" for parcel i.

While this description is primarily with respect to using a Euclidean distance between each salable parcel and the canonical parcel for each micro-market 410, the method 200 might select a substantially distinct way to determine distance, such as for example a Manhattan distance, or some other workable distance schema.

At a sub-step 264 (not shown in the FIG. 2), the method 200 determines its measure of dissimilarity in response to the distance measure it selected. For example and without limitation, as described below, lesser distance is deemed to represent lesser dissimilarity, and rank-ordering is not changed thereby, there is no particular need to actually compute the square root when determining the Euclidean distance.

While this description is primarily with respect to using the same or similar measure of distance for each micro-market 410, or, within a particular micro-market 410, between each salable parcel and the canonical parcel, in the context of the invention, there is no particular requirement for any such limitation. For a $1^{st}$ example and without limitation, the method 200 might choose to determine dissimilarity in response not just to distance in n-space, but also in response to features of the micro-market 410 itself, such as its number of parcels, number of recent sales, sales density, or the $1^{st}$ or $2^{nd}$ derivatives of any of those. For a $2^{nd}$ example and without limitation, the method 200 might choose to determine dissimilarity in response not just to distance, but also in response to the number of attribute values used for that particular micro-market 410.

Ranking Target Parcels

At a step 270, the method 200, collects the dissimilarity measures of each salable parcel from its associated canonical parcel (which might include more than one such dissimilarity measure for one or more salable parcels), and rank-orders the salable parcels by their dissimilarity measures.

The method 200 reports that the parcel with the least dissimilarity score is most likely to sell (within the next 6 months, or other selected duration), followed by the next-least, followed in rank order by each salable parcel. If a parcel has more than one such score (as for example if a parcel is assigned to more than one overlapping micro-market), the method 200 reports one of its two positions.

The association of index values to parcels may be used in many ways. In one embodiment of the invention, parcel addresses associated with high likelihoods of a sale can be used to create targeted direct mail pieces, using means known in the art such as the "one-to-one marketing service" provided by CoreFact Corporation. By developing and transmitting such pieces to the parcels with the highest likelihood of being sold in the near future, businesses whose customers are drawn from households that are buying or selling a home can maximize the impact of their direct mail budget. Further, data gathered during the home owner's response process (for example, a response to a direct mail piece in the form of logging onto a web site cited in the marketing piece to the homeowner, or the homeowner's assessment of when they might move as captured via communication with the originator of the direct mail piece (such as a real estate agent)) can be integrated into the process described above as new attributes or updated values for attributes, thereby improving the predictive capability of the process in the future for both that homeowner's parcel and for others in its micro-market 410 and market area.

In alternative embodiments, targeted direct communication to parcel owners and responses from them can be achieved by other communication means known in the art such as electronic mail, online agents, instant messaging, paging, video messaging, or short message service.

In alternative embodiments, the derivation of the MoveScore index from attributes of individual parcels and associated spatial units can be performed by other methods known in the art, or some combination or conjunction thereof, such as for example one or more of the following.

- Other Inferential Statistical methods
- Rule-based expert systems developed from information provided by those knowledgeable in the area and with sales in the area (potentially including what is important to the seller when deciding to sell)
- Neural networks The preferred embodiment described herein aggregates parcels by geographic area. It will be apparent to those skilled in the art that other embodiments can determine the likelihood of a sale of parcels or groups of parcels over other aggregations of parcels (for example, parcels whose mortgages are held by a specific institution, parcels owned by families with specific demographic characteristics, or parcels having structures with a particular class of roofing material).

The preferred embodiment described herein ranks properties by their likelihood of being sold in the near future. Alternative embodiments may be used to rank the likelihood of other events or characteristics of parcels and their households, such as mortgage refinancing, obtaining second mortgages or lines of credit, incidents covered by fire or casualty insurance, purchases of new homes, timeshares, second homes, vacation homes, and retirement homes, or making major purchases such as an automobile or boat.

Other applications of the present invention could include one or more of, or some combination or conjunction of, the following.

- Employing the invention to identify the likelihood that timeshare ownership units will be sold based on both the kinds of data described previously as well as information about which time periods the ownership units represented or which alternative locations the ownership units permitted use of.
- Employing the invention to build a time series of the MoveScore index to track the relative sales likelihood for a given parcel or collection of parcels. This time series version of the index could be used to build other indicator indexes that could be used by industries such as insurance, real estate, appraisal, government and others in assessing a given geographic area.
- Employing the invention to rank data records drawn from sources not organized by location (for example, a list of leads generated by means known in the art such as gathering information from visitors to a web site).
- Employing the invention to project specific spending behavior (such as large purchases of goods and services.)
- Employing the invention to project the type and/or location of people who should be marketed to as probable purchasers of real property which is listed for sale.
- Employing the invention to project the type of new home product which should be built in a geographic area to maximize builder sales.
- Employing the invention, together with hypothetical or projected data, for feasibility studies by businesses or governmental agencies.
- Employing the invention to project the number of homes and their attributes (such as number of bedrooms and lot size) that will be sold in a given time period for a given geography for the purpose of projecting "market levels" of absorption and/or the potential effect on the local market "health" in terms of price stability and other economic factors.
- Employing the invention to estimate the likelihood, within a specified future time period, of changes to the status of a parcel other than a sale, such as a refinancing, entering into a lease or rental agreement, entering into a lease-to-buy agreement, a landscape upgrade, or a remodel.
- Employing the invention to estimate the likelihood that household members occupying specific parcels will, within a specified future time period, become customers of specific types of businesses, such as restaurants, cinemas, or specialty retailers.
- Employing the invention to estimate, for a specified future time period, the likely occupancy of rental units within an apartment building or apartment complex.
- Employing the invention to estimate, for a specified future time period, market demand for businesses whose customers are drawn from sellers or buyers of real property. The invention can thus be used to plan office locations to be in proximity to areas likely to hold a greater-than-average number of transactions, and to size the offices appropriately.
- Presenting information concerning the relative likelihood of parcels being sold within a specified time period in a manner that can support advertising targeted to the individuals and businesses that value such information.
- Permitting businesses and individuals to generate referral fees and other income streams by exposing to other businesses and individuals those prospects that are more likely than average to sell a parcel of real property within a specific time period.
- Permitting governments and/or governmental agencies to project real property ownership changes in their geographies within a given time period, for purposes of projecting future revenues, expenditures, and infrastructure needs such as schools or services.
- Permitting businesses to project the changes which are likely to occur to real property ownership within geography within a given time period for purposes of projecting future business offerings, such as the number and style of homes which a builder might build to satisfy future demand.
- Permitting businesses and individuals to rank and score their existing and/or past client bases for their likelihood of a move within a given time period.

ALTERNATIVE EMBODIMENTS

After reading this application, those skilled in the art would recognize that the scope and spirit of the invention includes other and further embodiments beyond the specifics of those disclosed herein, and that such other and further embodiments would not require new invention or undue experimentation.

While various embodiments of the invention have been described above, it should be understood that they have been presented by way of example, and not limitation. It will be apparent to persons skilled in the art that many changes in form or detail may be made without departing from the spirit and scope of the invention. This is especially true in light of new technology and terms within the relevant art(s) that may be later developed. Thus, the embodiments described herein are exemplary, and should not be considered limiting in any way.

APPENDIX A

List of Attributes for One Embodiment of the Invention
Each attribute is followed by a brief description.
1 Number of recent sales
The number of recent sales within the prior 6 months and ¼ mile from target parcel 2 Number of surrounding parcels
   Total number of residential parcels within ¼ mile of target parcel
3 Sales to parcel ratio
   Number 1 divided by number 2
4 Months since most recent sale
   For sales used to create canonical parcels, the number of months between the last two known sales. For parcels being evaluated for their difference from a canonical parcel, the number of months from the last known sale. This value is set to 360 if last sale date is unknown or more than 30 years past.
5 % Population less than 18 years
   Number of people in the local area (as determined by the demographic data provider) younger than 18 divided by total population in the local area
6 % Population greater than 65 years
   Number of people in the local area (as determined by the demographic data provider) older than 65 divided by total population in the local area
7 Building area
   From commercial data vendor file
8 Building age
   Current year less year built
9 Lot size
   From commercial data vendor file
10 Sale price estimate
   Value of a sale price surface (generated from recent sales) at the latitude/longitude for a specific parcel
11 Sale price per sq. ft. estimate
   Value of a sale price per sq. ft. surface (generated from recent sales) at the latitude/longitude for a specific parcel

The invention claimed is:

1. A computer-implemented method, comprising:
   receiving, by at least one computer, data associated with a set of a plurality of parcels;
   selecting, by said at least one computer, at least one selected parcel of said plurality of parcels,
      said at least one selected parcel being more likely to at least one of:
         be sold, or
         be offered for sale,
      within a selected time
      than at least one of said plurality of parcels not one of said at least one selected parcel;
   wherein said selecting comprises:
   defining, by said at least one computer, at least one micro-market,
      wherein each of said at least one micro-market comprises
         at least one first subset of said set of said plurality of parcels;
   determining, by said at least one computer,
      for substantially each said at least one micro-market
      a model associated with said at least one micro-market; and
   for at least a second subset of said set of said plurality of parcels comprising
      a second plurality of parcels,
   defining, by said at least one computer, a relative order of said second plurality of parcels based on at least one of:
      likelihood of sale, or
      being offered for sale,
   within said selected time,
   in response to
      comparing, by said at least one computer, each given parcel of said second plurality of parcels,
      with an associated model of a given micro-market,
         said given micro-market being associated with said each given parcel; and
   providing, by said at least one computer, said at least one selected parcel of said plurality of parcels.

2. The computer-implemented method according to claim 1,
   wherein said comparing comprises
      determining, by said at least one computer, a measure of similarity between said each given parcel
         and said associated model of said given micro-market.

3. The computer-implemented method according to claim 1,
   wherein each said at least one micro-market
   is responsive to
   a measure of size of
      said at least one micro-market, said at least one micro-market being geographically contiguous.

4. The computer-implemented method according to claim 1, wherein
   substantially each said model
   is specific to a micro-market.

5. The computer-implemented method according to claim 1, wherein
   substantially each said model
   associated with said associated micro-market, comprises:
   wherein said micro-market comprises at least one of:
      being a geographically convex shape;
      being a polygon shape;
      being a circular shape; or
      being a hexagonal shape.

6. The computer-implemented method according to claim 1, wherein
   a set of said at least one micro-markets
   substantially tiles
   a region including substantially all said set of said plurality of parcels.

7. The computer-implemented method according to claim 1, wherein
   at least one of said at least one micro-market comprises at least a 1st selected number of said plurality of said parcels sold within a 1st selected time.

8. The computer-implemented method according to claim 7, wherein
   said set of said plurality of parcels
   defines, by said at least one computer, at least one of said at least one micro-market
      each said at least one micromarket having fewer than a $2^{nd}$ selected number of said plurality of said parcels sold within a $2^{nd}$ selected time.

9. The computer-implemented method according to claim 1,
   wherein substantially each said model comprises a representation of
   a point in a multi-dimensional space,
      at least one dimension of said multi-dimensional space being responsive to values of attributes of said data associated with at least one of said plurality of said parcels.

10. The computer-implemented method according to claim 9, wherein
   said at least one dimension comprises normalized ones of said values of said attributes.

11. The computer-implemented method according to claim 9, wherein
   said multi-dimensional space is substantially topologically equivalent to $R^a$.

12. The computer-implemented method according to claim 9, wherein
said comparing comprises
determining, by said at least one computer, a location in said multi-dimensional space corresponding to said each parcel,
determining, by said at least one computer, a measure of distance in said multi-dimensional space between said location in said multi-dimensional space corresponding to said each parcel and said representation of said point in said multi-dimensional space of said model; and
said defining comprises
ranking, by said at least one computer, said plurality of said parcels by said measure of distance.

13. The computer-implemented method according to claim 9, wherein
said comparing comprises for each said parcel,
determining, by said at least one computer, a measure of dissimilarity between said parcel and said model; and
said measure of dissimilarity is substantially comparable among a plurality of said models.

14. The computer-implemented method according to claim 9, wherein said attributes comprise at least one of:
a historic, demographic, or psychographic data attribute;
a demographic, or psychographic projection;
a historical, recent, or projected information about a business establishment;
a historical, recent, or projected information about a business employment;
a historical, recent, or projected information about a lifestyle segmentation;
a historical, recent, or projected information about a classification of a lifestyle segmentation;
a historical, recent, or projected information about a transportation system;
a historical, recent, or projected information about a road, a highway, a bus route, or terminal facility transportation system;
a historical, recent, or projected information about a land use characteristic;
a historical, recent, or projected information about a park or shopping center land use characteristic;
a historical, recent, or projected information about a legislative or regulatory enactment, or frequency thereof;
a historical, recent, or projected information about a political, municipality, school district, or administrative boundary;
a household specific attribute;
a neighborhood specific attribute;
a parcel specific attribute;
a latitude, a longitude, a lot size, a sale date, a local population, a population in an age segment, an area of a building, a building age or a sales price parcel specific attribute;
a time since last sale; a prior sale frequency;
a number of recent sales;
a number of surrounding parcels;
a ratio of attributes;
a ratio of number of recent sales to number of surrounding parcels;
a ratio of number of recent sales to number of surrounding parcels within an associated micro-market;
a number of sales to a number of parcels ratio;
a ratio of number of recent sales to number of surrounding parcels;
a ratio of number of recent sales to number of surrounding parcels within a selected distance buffer;
a number of months since most recent sale of said selected parcel;
a number of months between the last two known sales, for sales used to create an associated model or canonical parcel;
a number of months from the last known sale, for parcels evaluated for difference from an associated model or a canonical parcel;
a number of people in an area associated with said selected parcel in a given age range, divided by a total population in the area;
a number of people in an area associated with said selected parcel younger than a given age, divided by a total population in the area;
a number of people in an area associated with said selected parcel younger than 18, divided by a total population in the area;
a number of people in an area associated with said selected parcel older than a given age, divided by a total population in the area;
a number of people in an area associated with said selected parcel older than 65, divided by a total population in the area;
a building area;
a building age calculated by calculating a difference between a current year less a year building built;
a lot size;
a sale price estimate;
a value of a sale price surface area at a latitude/longitude for a specific parcel;
a value of a sale price surface area generated from recent sales at a latitude/longitude for a specific parcel;
a sale price per area estimate;
a value of a sale price per area surface at a location for a specific parcel;
a value of a sale price per area surface generated from recent sales at a location for a specific parcel
a value of a sale price per area surface at a latitude/longitude for a specific parcel; or
a value of a sale price per area surface generated from recent sales at a latitude/longitude for a specific parcel.

15. The computer-implemented method according to claim 1, wherein each of said plurality of parcels comprises at least one of:
a spatial unit; a real estate parcel; real property; a single family residence; a townhome; a condominium; a multi-floor structure; a multiunit structure; personal property; or an automobile.

16. The method according to claim 1, wherein said comparing comprises:
comparing, by said at least one computer, said each given parcel with a micro-market specific comparison with said associated model of said given micro-market associated with said each given parcel.

17. The method according to claim 1, wherein said model comprises a canonical sold parcel within a predetermined time period.

18. A computer-implemented method, comprising
receiving, by at least one computer, data associated with a set of a plurality of parcels;
determining, by said at least one computer,
for a 1st parcel and a 2nd parcel of said plurality of said parcels, one of said 1st and said 2nd parcels at least one of:
   more likely to sell, or
   more likely to be offered for sale,
   within a selected time;
wherein said determining comprises:
   defining, by said at least one computer, at least one micro-market,
      wherein each said at least one micro-market comprises
         at least one first subset of said set of said plurality of parcels;
   determining, by said at least one computer,
      for substantially each said at least one micro-market
         a model associated with said at least one micro-market; and
   for at least a second subset of said set of said plurality of parcels comprising
      a second plurality of parcels,
   defining, by said at least one computer, a relative order of said second plurality of parcels based on at least one of:
      likelihood of sale, or
      being offered for sale,
   within said selected time,
   in response to
      comparing, by said at least one computer, each given parcel of said second plurality of parcels,
      with an associated model of a given micro-market, said given micro-market being associated with said each given parcel; and
   providing, by said at least one computer, said one of said 1st and said 2nd parcels determined to be more likely to sell or be offered for sale of said set of said plurality of parcels.

19. A computer-implemented method, comprising
receiving, by at least one computer, data associated with a set of a plurality of parcels;
defining, by said at least one computer, at least one micro-market
   each said at least one micro-market comprising a subset of said set of said plurality of parcels,
   each said micro-market responsive to
      a measure of distance between a 1st and a 2nd parcel in said micro-market;
describing, by said at least one computer, for substantially each said micro-market,
   an associated model;
determining, by said at least one computer, a relative order of at least one of:
   likely sale; or
   likely offer for sale;
within a selected time;
in response to
for each particular parcel
   comparing, by said at least one computer, said parcel with said associated model of said micro-market; and
providing, by said at least one computer, said relative order determined based on said comparing.

20. A computer-implemented method, comprising:
a) transforming, by at least one computer, data
   said data responsive to a set of a plurality of parcels into a set of models
   at least one of said models
      said data responsive to at least a portion of said data associated with a subset of said set of said plurality of parcels
      and said data responsive to a measure of distance between a plurality of said plurality of parcels associated with said particular one model
wherein
said transforming of said data comprises:
   i) ordering, by said at least one computer, a 1st and a 2nd parcels
   with respect to at least one of:
      a likelihood of sale; or
      a likelihood of offer for sale;
   within a selected time;
wherein said ordering comprises:
   A) defining, by said at least one computer, at least one micro-market,
      wherein each said at least one micro-market comprises
         at least one first subset of said set of said plurality of parcels;
   B) determining, by said at least one computer,
      for substantially each said at least one micro-market
         a model associated with said at least one micro-market; and
   C) for at least a second subset of said set of said plurality of parcels comprising
      a second plurality of parcels,
      defining, by said at least one computer, a relative order of said second plurality of parcels based on at least one of:
         likelihood of sale, or
         being offered for sale,
      within said selected time,
      in response to
      D) comparing, by said at least one computer, each given parcel of said second plurality of parcels,
         with an associated model of a given micro-market, said given micro-market being associated with said each given parcel.

21. The computer-implemented method according to claim 20, wherein
substantially each said model is associated with a micro-market,
said micro-market being geographically contiguous.

22. The computer-implemented method according to claim 20, wherein
substantially each said model associated with said associated micro-market comprises:
wherein said micro-market comprises at least one of:
   being a geographically convex shape;
   being a polygon shape;
   being a circular shape; or
   being a hexagonal shape.

23. A computer implemented system comprising:
at least one database;
at least one computer coupled to said at least one database;
at least one communication network coupled to said at least one computer;
wherein said at least one computer is adapted to compute a ranking comprising:
   means for receiving, by said at least one computer from said at least one communication network, data associated with a set of a plurality of parcels into said at least one database;
   means for selecting, by said at least one computer, at least one selected parcel of said plurality of parcels,
      wherein said at least one selected parcel being more likely to at least one of:
         be sold, or
         be offered for sale, within a selected time,
than at least one of said plurality of parcels not one of said at least one selected parcel,
wherein said means for selecting comprises:
means for defining, by said at least one computer, at least one micro-market,
wherein each said at least one micro-market comprises
at least one first subset of said set of said plurality of parcels;
means for determining, by said at least one computer,
for substantially each said at least one micro-market
a model associated with said at least one micro-market; and
for at least a second subset of said set of said plurality of parcels comprising a second plurality of parcels,
means for defining, by said at least one computer, a relative order of said second plurality of parcels based on at least one of:
likelihood of sale, or
being offered for sale,
within said selected time,
in response to
means for comparing, by said at least one computer, each given parcel of said second plurality of parcels,
with an associated model of a given micro-market, said given micro-market being associated with said each given parcel; and
means for providing, by said at least one computer, for display or over said at least one communication network, said at least one selected parcel being more likely to be sold or offered for sale within said selected time than said plurality of parcels not of said at least one selected parcel of said set of said plurality of said parcels.

24. A computer program product embodied on a computer accessible medium, said computer program product comprising program logic, which when executed by at least one computer performs a method, comprising:

receiving, by the at least one computer, data associated with a set of a plurality of parcels;
selecting, by the at least one computer, at least one selected parcel of said plurality of parcels,
said at least one selected parcel being more likely to at least one of:
be sold, or
be offered for sale,
within a selected time,
than at least one of said plurality of parcels not one of said at least one selected parcel;
wherein said selecting comprises:
defining, by the at least one computer, at least one micro-market,
wherein each said at least one micro-market comprises
at least one first subset of said set of said plurality of parcels;
determining, by the at least one computer,
for substantially each said at least one micro-market
a model associated with said at least one micro-market; and
for at least a second subset comprising
a plurality of parcels of said set of said plurality of parcels,
defining, by the at least one computer, a relative order of said plurality of parcels within said second subset based on at least one of:
likelihood of sale, or
being offered for sale,
within said selected time,
in response to
comparing, by the at least one computer, each given parcel of said plurality of parcels in said second subset,
with an associated model of a given micro-market being associated with said each given parcel; and
providing, by the at least one computer, said at least one selected parcel of said plurality of parcels.

* * * * *